(12) United States Patent
Ossian et al.

(10) Patent No.: US 7,473,379 B2
(45) Date of Patent: Jan. 6, 2009

(54) PROCESSED RAFFINATE MATERIAL FOR ENHANCING MELT VALUE OF DE-ICERS

(75) Inventors: Kenneth C. Ossian, Bettendorf, IA (US); Kelly Behrens, Davenport, IA (US)

(73) Assignee: Ossian, Inc., Davenport, IA (US)

( * ) Notice: Subject to any disclaimer, the term of this patent is extended or adjusted under 35 U.S.C. 154(b) by 137 days.

(21) Appl. No.: 11/566,390

(22) Filed: Dec. 4, 2006

(65) Prior Publication Data

US 2008/0128651 A1 Jun. 5, 2008

(51) Int. Cl.
*C09K 3/18* (2006.01)
(52) U.S. Cl. .......................................... 252/70; 106/13
(58) Field of Classification Search .................... 252/70; 106/13

See application file for complete search history.

(56) References Cited

U.S. PATENT DOCUMENTS

| | | | |
|---|---|---|---|
| 5,683,619 A | 11/1997 | Ossian et al. | |
| 6,080,330 A | 6/2000 | Bloomer | |
| 6,506,318 B1 * | 1/2003 | Sapienza et al. | ............... 252/70 |
| 6,605,232 B1 | 8/2003 | Montgomery et al. | |
| 6,751,902 B1 * | 6/2004 | Long | ............... 47/2 |
| 6,890,451 B2 * | 5/2005 | Sapienza et al. | ............... 252/70 |
| 7,122,127 B1 | 10/2006 | Ossian | |
| 7,138,071 B2 * | 11/2006 | Sapienza et al. | ............... 252/70 |
| 7,270,768 B2 * | 9/2007 | Sapienza et al. | ............... 252/70 |

* cited by examiner

*Primary Examiner*—Anthony J Green
(74) *Attorney, Agent, or Firm*—McKee, Voorhees & Sease, P.L.C.

(57) ABSTRACT

A composition for both de-icing and inhibiting formation of ice and snow that uses as its predominant ingredient desugared, sugar beet molasses which has been treated with alkali to increase its pH to at least 11, followed by holding for a time sufficient to degrade the carbohydrates and protein of the desugared, sugar beet molasses, and then the pH is lowered by acid addition to at least 10. These steps, in this sequence, substantially and surprisingly increase melt value.

18 Claims, 11 Drawing Sheets

US 7,473,379 B2

PROCESSED RAFFINATE MATERIAL FOR ENHANCING MELT VALUE OF DE-ICERS

FIELD OF THE INVENTION

This invention relates to de-icing and ice melting compositions for use in preventing or reducing ice and snow accumulation on surfaces. In particular, the invention relates to the use of desugared, sugar beet molasses (raffinate) processed in a certain way to enhance melt value.

BACKGROUND OF THE INVENTION

De-icing compositions are widely used in northern areas of the country, particularly in the northern climates subject to heavy ice and snow conditions in the winter months. One of the inventors of the present composition has numerous patents on ice melters. See, for example, U.S. Pat. No. 7,122,127, which relates to liquid ice melters, and U.S. Pat. No. 5,683,619 which relates to solid ice melting compositions which are environmentally friendly. The disclosure of these patents is incorporated herein by reference.

A good ice melter for roads, sidewalks, parking lots, etc. is inexpensive, easy to manufacture, effective in melting snow and ice, and easy to apply. The best ones also provide reduced corrosion to application equipment while also having beneficial effects to vegetation. All of these advantages in one ice melter has been a goal of the ice melting industry for some time.

Effective in melting means a product capable of melting below zero F. Ease of application is also important because labor cost is one of the largest components of melting snow and ice. Liquid melters bring ease to the application process.

In Ossian, Inc.'s earlier U.S. Pat. No. 5,683,619 (Ossian & Steinhauser), we created a product that melted below zero and could have a positive effect on vegetation. The major disadvantages to this earlier invention were the high cost to produce the product and cost of application. It used calcium chloride and urea in a dry melter composition. When calcium chloride is manufactured for industrial use it starts out as a liquid. The water is then evaporated to form a flake or pellet. This manufacturing process uses considerable energy adding to the cost of manufacture for the raw material. Some of this cost could be avoided if the ice melter were liquid as finished.

The solid ice melter of U.S. Pat. No. 5,683,619 is advantageous in that it is an effective melter, and it brings a positive effect on vegetation. It is in content a combination of urea and calcium chloride in a solid particle format. In recent times it has been of interest to develop liquid ice melters. In some environments, liquid ice melters are preferred to solid ice melters in that they give better coverage, they are much quicker acting melters, and they are more economical to prepare.

The liquid ice melter of U.S. Pat. No. 7,122,127 is a product that is less expensive to manufacture, easy to use, melts below zero and can have a positive effect on vegetation. In that invention, we used liquid calcium chloride solution combined with either dry or liquid urea, in critical ratios to achieve an effective liquid ice melter.

The industry has long looked for ways to either reduce or eliminate the use of salt for de-icing roadways, parking lots, sidewalks, etc. One of the more successful approaches has been the use of prewetting and anticing.

Prewetting is the process of coating salt with different solutions as the salt is being applied to the roadway. These solutions are traditionally brines of sodium chloride, magnesium chloride and calcium chloride. In addition, various molasses agriculture by-products are sometimes included with the solution. These by-products increase the viscosity of the prewet solution. The prewet process increases the melt value of the salt and reduces the bounce and scatter of dry salt when it hits the pavement. "Melt value" as used here refers to the ability to melt ice to water at a given temperature, and it is measured by the volume of water achieved.

Anticing is putting the ice melter down in liquid form prior to the weather event. The concept being, it is easier to melt snow and ice from the bottom up as opposed to melting snow and ice from the top down. This concept uses less salt and is practiced by a number of State and Municipal governments. However, this method has its limits because common liquid ice melters such as solutions of calcium chloride, magnesium chloride, sodium chloride and potassium acetate have a low viscosity. These products do not stay in place but will easily penetrate into the concrete and will not have enough residual left on top of the pavement for very much melting action to occur. The problem is even more of an issue when liquid sodium chloride is used. The water in the solution will evaporate leaving a chalky salt residue that in some cases may dry up and will blow away before the weather event occurs.

To address this issue many have turned to a molasses type by-product derived from sugar beet, sugar cane, corn sugars and steep water, brewers condensed solubles, distillers solubles, or mixtures thereof to increase viscosity. These by-products can provide value to the various solutions of calcium chloride, magnesium chloride, sodium chloride and potassium acetate by keeping them in place during the melting process. Adding these compositions to solutions of these chemicals helps keep them in place. See Patents: Bloomer U.S. Pat. Nos. 6,416,684; 6,641,753 and 6,080,330; Hartley U.S. Pat. Nos. 6,299,793; 6,436,310; 6,440,325; 6,582,622; 6,596,188; 6,599,440; 6,770,217; 6,805,811, 6,827,873, 6,905,631, 7,014,789; Koefod U.S. Pat. Nos. 6,398,979; 6,800,217; Roderick U.S. Pat. No. 6,605,121.

However, all these patented products have a major limitation. The sugar by-products alone are very poor ice melters and their value is only to increase viscosity. They, therefore, raise the overall costs and in most cases add little to no melting value to the liquid solution.

There has been some effort to improve the melt values of the sugar/molasses mixtures in U.S. Pat. No. 6,605,232. This patent degrades reducing sugars to a pH of 6.0 to 9.0 from steep water waste stream of agribusiness with an alkali. It requires a reducing sugar concentration of 10 to 70 parts of weight. This process is limited in availability of raw materials and in the increased melt value. In addition, it does not include the use of chloride salts. U.S. Pat. No. 6,080,330 uses raffinate but only to increase viscosity and without any melt value enhancing pretreatment of the raffinate.

Accordingly, it is a primary objective of the present invention to prepare an ice melter prewet in liquid form that is easily processable, and which, by reason of pretreatment of raffinate material increases melt value over the liquid solution. This is accomplished by using a carbohydrate/protein mixture from desugared beet molasses and enhances its melting value by adding a liquid alkali solution to degrade and then adding an acid solution. The end product has increased melting values and can be blended with chloride salts of calcium, magnesium, sodium, and potassium acetate. The product may also be used by itself where no chlorides are desired and may include the addition of urea to enhance vegetation.

BRIEF SUMMARY OF THE INVENTION

A composition for both de-icing and inhibiting formation of ice and snow that uses as its predominant ingredient desugared, sugar beet molasses which has been treated with alkali to increase its pH to at least 11, followed by holding for a time sufficient to degrade the carbohydrates and protein of the desugared, sugar beet molasses, and then the pH is lowered by acid addition to at least 10. These steps, in this sequence, substantially and surprisingly increase melt value.

DETAILED DESCRIPTION OF THE PREFERRED EMBODIMENT

Certain definitions are worthy of mention at the outset. "Melt value" is used herein as earlier defined. "Treated raffinate", refers to desugared, sugar beet molasses by-product obtained from sugar beet molasses processing plant that is used with the treatment of the present invention; that it is initially treated to increase its pH to at least 11, followed by holding for a time sufficient to degrade the desugared, sugar beet molasses by hydrolysis of the carbohydrate/protein material, which is then followed by acid addition to lower the pH to further enhance melt value.

Listed below are the ice melt values of various carbohydrate/protein by-product mixtures that are derived from various sugar processing plants. Once the sugar has been extracted from these products, the remaining by-products are traditionally sold as animal feeds. They also can be blended with various ice melting salts to increase the viscosity of the solution.

| Sample #1 | Sample #2 | Sample #3 |
|---|---|---|
| Heavy Corn Steep | Cane Molasses | Desugared Beet Molasses |
| 35% to 40% solids | 78% solids | 62.5% solids |
| pH 4.5 | pH 4.3 | pH 7.2 |
| Viscosity 23 cSt | Viscosity 1414 cSt | Viscosity 65 cSt |

-continued

| Sample #1 | Sample #2 | Sample #3 |
|---|---|---|
| Total Sugar | Total Sugar | Total Sugar |
| Content: 5% approx. | Content: 48% | Content: 15% to 20% |
| Net melt values for: | Net melt values for: | Net melt values for: |
| 60 Min @ 15° F. | 60 Min @ 15° F. | 60 Min @ 15° F. |
| SHRP H-205.2 | SHRP H-205.2 | SHRP H-205.2 |
| 0.0000 | 0.0000 | 1.3849 |
| 0.0000 | 0.0000 | 1.6835 |
| 0.0000 | 0.0000 | 1.7706 |
| 0.0000 | 0.0000 | 1.8607 |
| Total Avg. 0.0 | Total Avg. 0.0 | Total Avg. 1.6749 |

Figure 1:
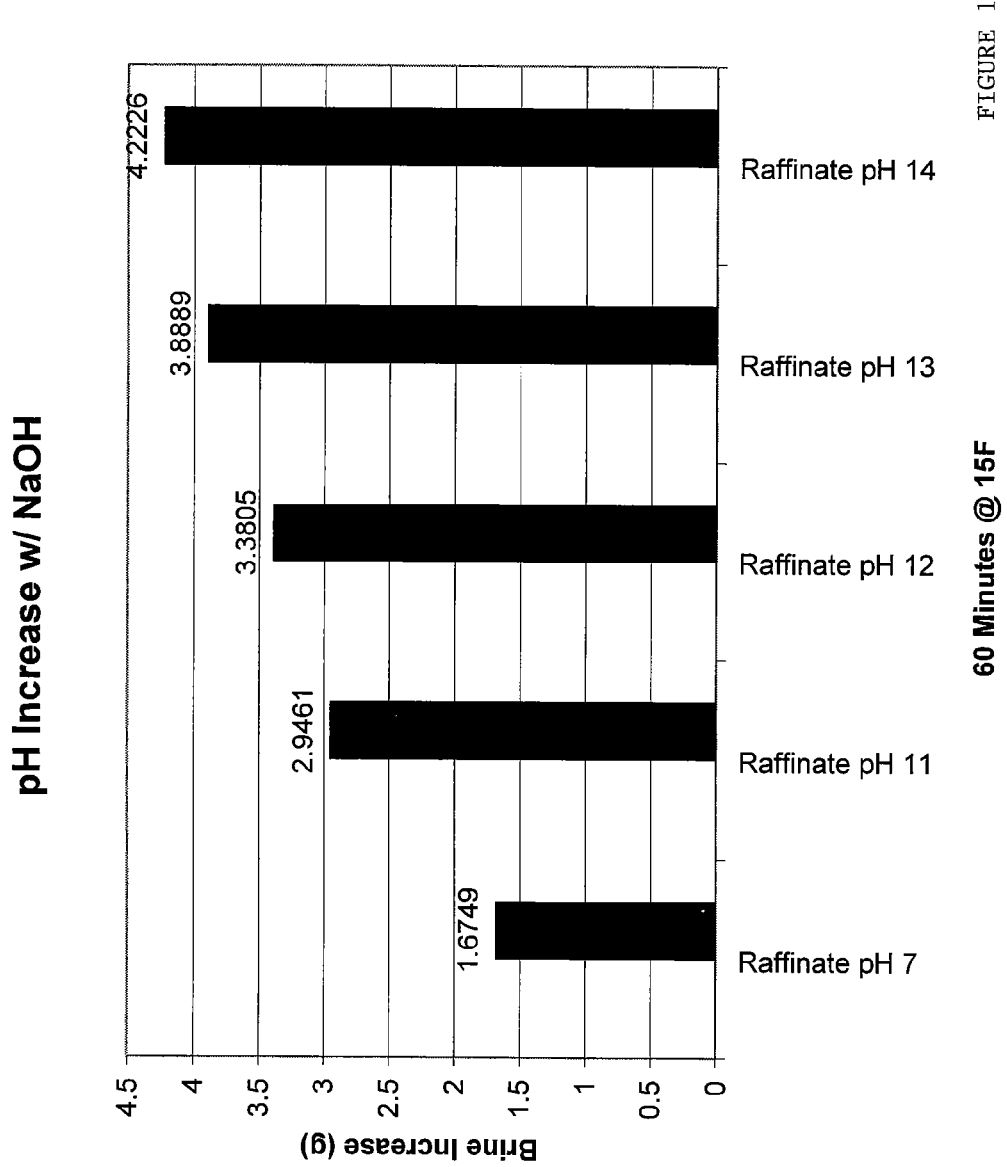
FIG. 1 shows the melt value of three typical samples of various carbohydrate/protein by-product mixtures of sugar processing plants.

FIG. 1 shows the melting values of these three samples for 60 minutes at 15° above zero using SHRP Standard H-205-2. This standard test places 3.8 (ml) of liquid ice melter on ice in a controlled laboratory freezer. The melted brine is extracted and weighed. The net gain in grams is determined. The process is repeated four times and the averages are plotted on FIG. 1 as melt values.

In reviewing the melting values in FIG. 1, the only carbohydrate/protein mixture to exhibit any melting value is Sample #3, desugared beet molasses. The typical specifications for this carbohydrate/protein mixture of desugared beet molasses called raffinate are as shown in Table I below.

TABLE I

| Raffinate (Desugared Beet Molasses): | |
|---|---|
| Dry Matter | 65.70% |
| Moisture | 34.30% |
| Protein, Crude | 15.19% |
| Fiber, Crude | 00.00% |
| pH | 7 to 8 |
| Total Sugars | *13% to 20% |

*6.58% of the total sugars are Reducing Sugars.

In our invention, we use an alkali to raise the pH and increase the melting value. We then use an acid to lower the pH which continues to raise the melting value. In our first example that follows, we use a 50% liquid solution of sodium hydroxide as the alkali and in the second example we use both hydrochloric acid and acetic acid as our acid additions. It is important to note that liquid sodium hydroxide has a freeze point of 53.6° F. and acetic acid has a freeze point of 62° F. One might assume from these numbers that the addition of these two items would actually raise the freeze point of the solution resulting in less melting value. However, the opposite happens in our invention. The additions of the alkali and acid is increasing the ionic strength of the carbohydrate/protein solution and thereby lowering the freeze point of the solution.

By adding the acid to our mixture, we accomplish two objectives. The one is to lower the pH which makes the product easier to handle and secondly, we will enhance the melting value of our solution.

Applicants are unsure what it is that causes the surprising result of initially enhanced melt value by the alkali treatment to increase pH to within the range of 11 to 14 followed by acid addition to lower it to at least 10, but preferably to at least 9. One explanation is the degradation of the carbohydrates/proteins in the desugared, sugar beet molasses is also sufficient in formation of other compounds to increase melt value initially, but it is not known at all why the addition of acid, to lower pH would continue to enhance melt valu; and, why the addition of the preferred acidic acid would enhance melt value even more. Applicants do not, therefore, wish to be bound by any theory here presented as to why the invention works.

The alkali material used to initially raise the pH can be sodium hydroxide or calcium hydroxide or any of the alkaline earth or group II hydroxides. Preferred is the most easily available, sodium hydroxide. As far as the acid used in the acidic addition, any inorganic acid and/or acetic acid can be employed. Simple examples include sulfuric, hydrochloric, phosphoric, etc. but preferred is acetic acid because it enhances the value further than the others, for reasons presently unknown. The composition may be used alone as a very processable and useable prewetting and anticing liquid. It may also be used as a blend with other de-icers or ice melters such as liquid sodium chloride, liquid calcium chloride, liquid magnesium chloride and liquid potassium acetate. Minors, to enhance certain selective properties may also be added such as abrasives, surfactants, stabilizers, corrosion inhibitors and even vegetation friendly ice melt additives such as urea. Where blends are employed the amount of the treated raffinate will be from 3% or more by weight and preferably 10% by weight to 50% by weight; the amount of any minors will be 5% or less.

The following examples are offered to further illustrate but not limit the process of the invention.

EXAMPLES

In the first example that follows, we use raffinate (desugared beet molasses) alone and then add increasing amounts of alkali to the next four samples significantly raising their pH values. The first sample is raffinate as it is received from the sugar beet processor. The second sample is raffinate with added sodium hydroxide raising the pH from 7 to 11 increasing the melting value by 75%. The third sample is raffinate with added sodium hydroxide raising the pH from 7 to 12 increasing the melting value by 101%. The fourth sample is raffinate with added sodium hydroxide raising the pH from 7 to 14 increasing the melting value by 132%. The final sample is raffinate with added sodium hydroxide raising the pH from 7 to 13 increasing the melting value by 132%. The final sample is raffinate with added sodium hydroxide raising the pH from 7 to 14 increasing the overall melting value by 152%. These are shown in FIG. 2.

Figure 2:
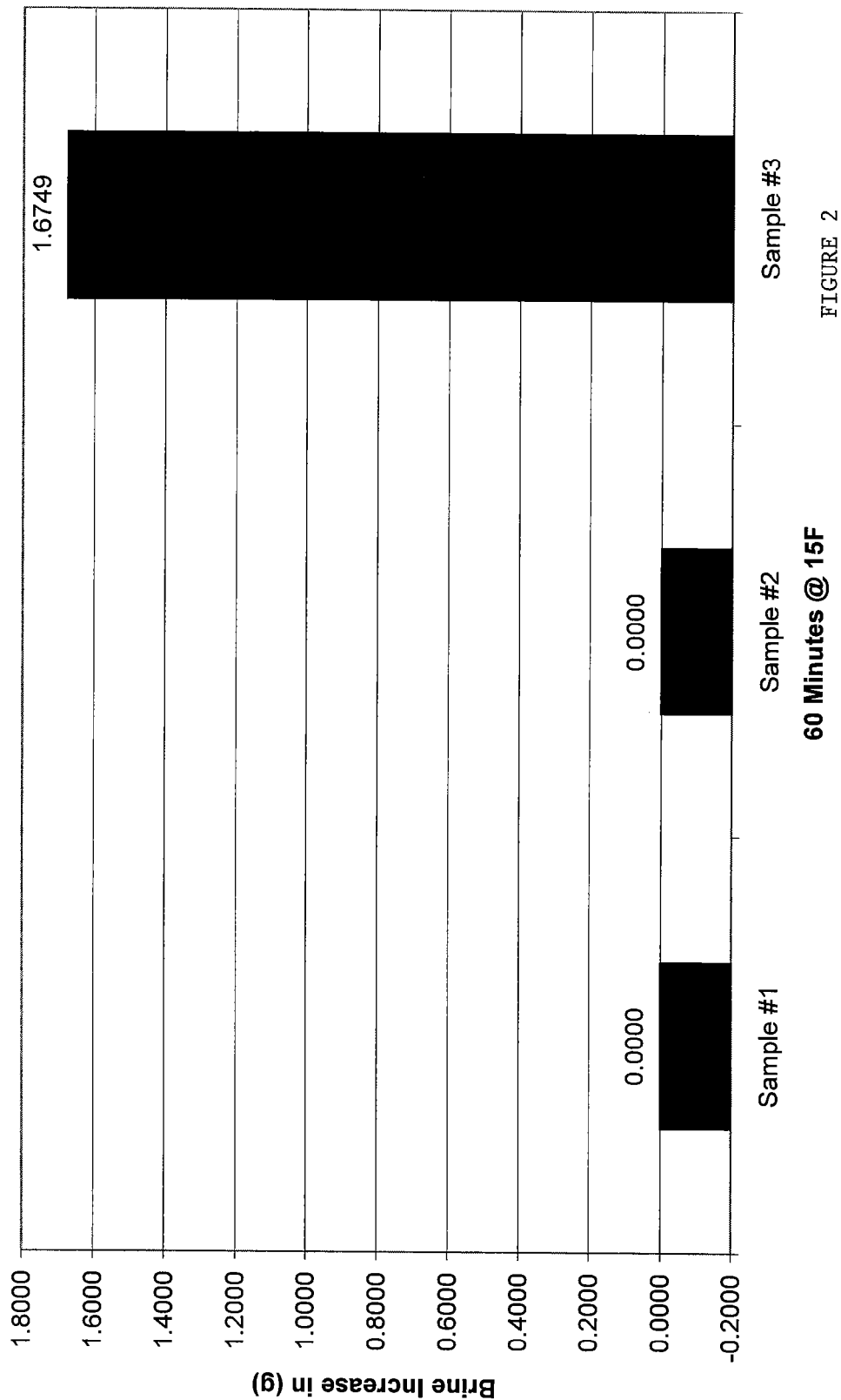
FIG. 2 shows pH increase in corresponding melt value increase of raffinate (desugared beet molasses) when treated with sodium hydroxide at various pHs.

In looking at the melt values in the above tests of FIG. 2, we can see that the addition of sodium hydroxide has dramatically increased the melting value in all samples.

Figure 3:
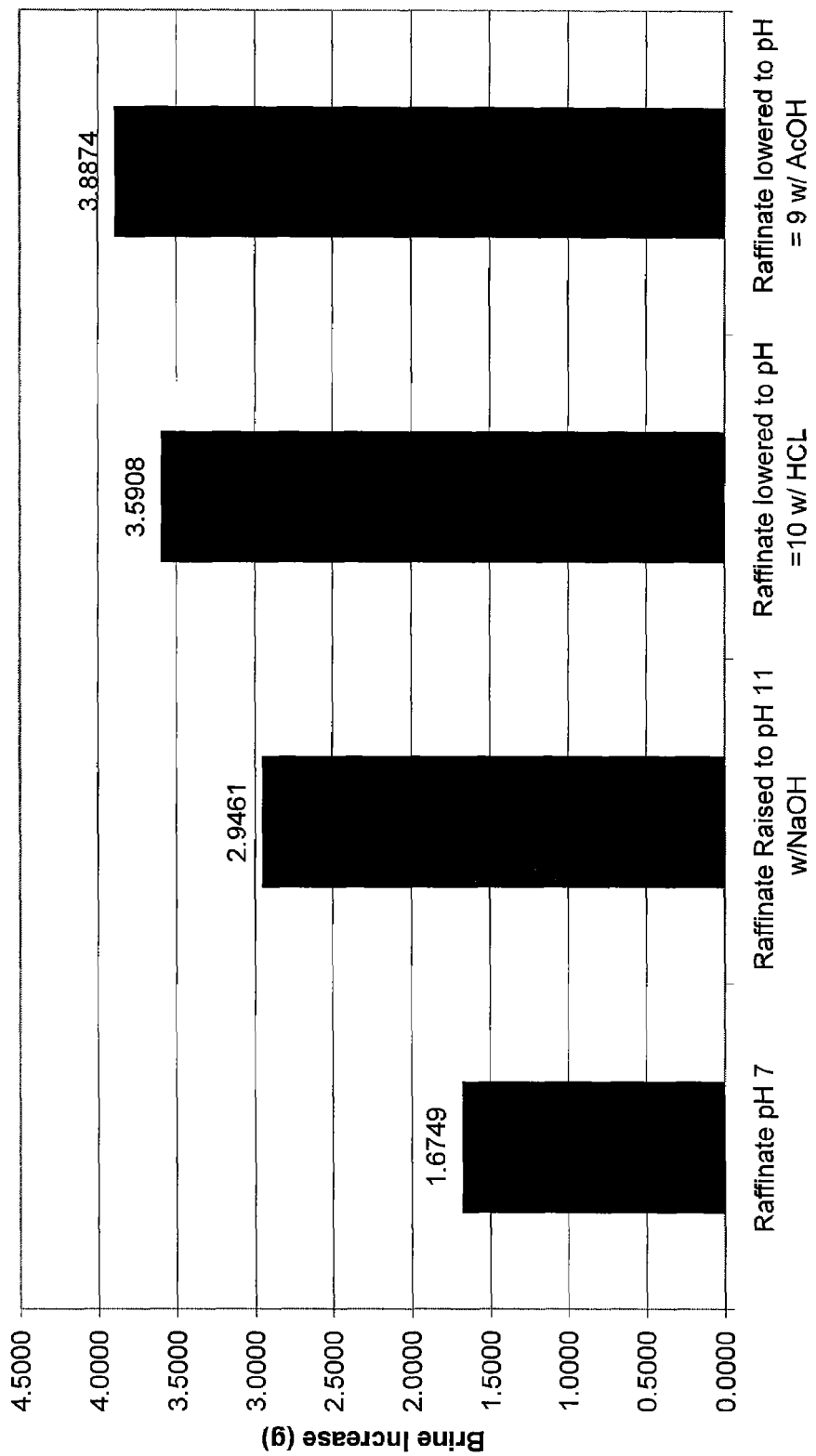
FIG. 3 demonstrates in graph form how raffinate first raised pH by degradation with alkali materials such as sodium hydroxide following by lowering pH with acid addition increases melt value.

The next step in our process is to add an acid to these samples to lower the pH. In the examples below shown in FIG. 3, we start with raffinate and then add the alkali to a pH of 11. In the next sample we add hydrochloric acid and lower the pH from 11 to 10. These step increases the melting value an additional 21%. In the final sample of FIG. 3, below we added acetic acid and lowered our pH from 11 to 9. This step increases the melting value an additional 31%. If we take into account the addition of both sodium hydroxide and acetic acid, we have increased the overall melting value by 132% over the plain raffinate as supplied. In reviewing which acid to use in lowering the final pH, the advantage is with acetic acid. Less material is required and a lower pH is achieved with a higher melting value.

Figure 4:
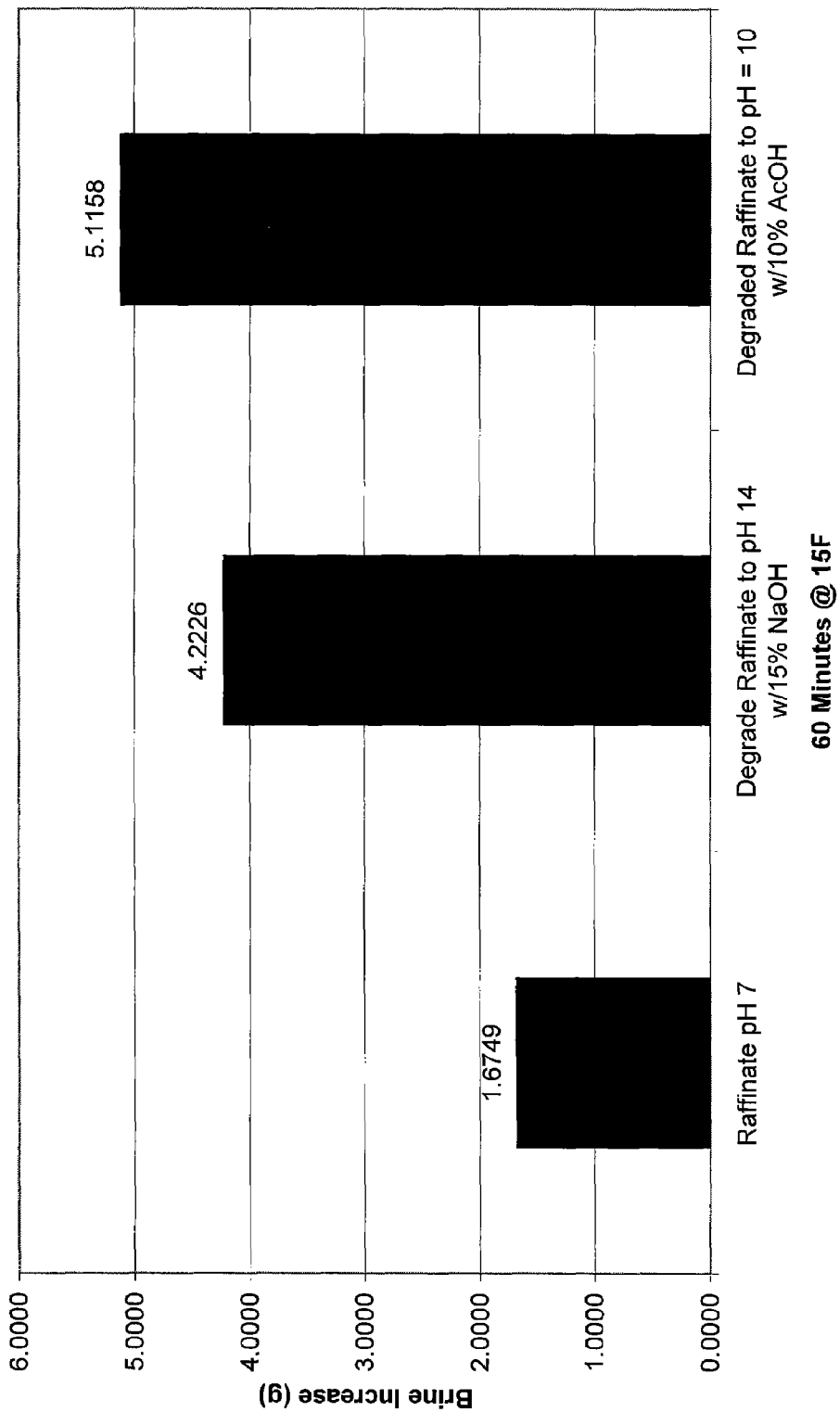
FIG. 4 shows the use of the preferred acid addition of acetic acid and the affect on melt value.
Figure 5:
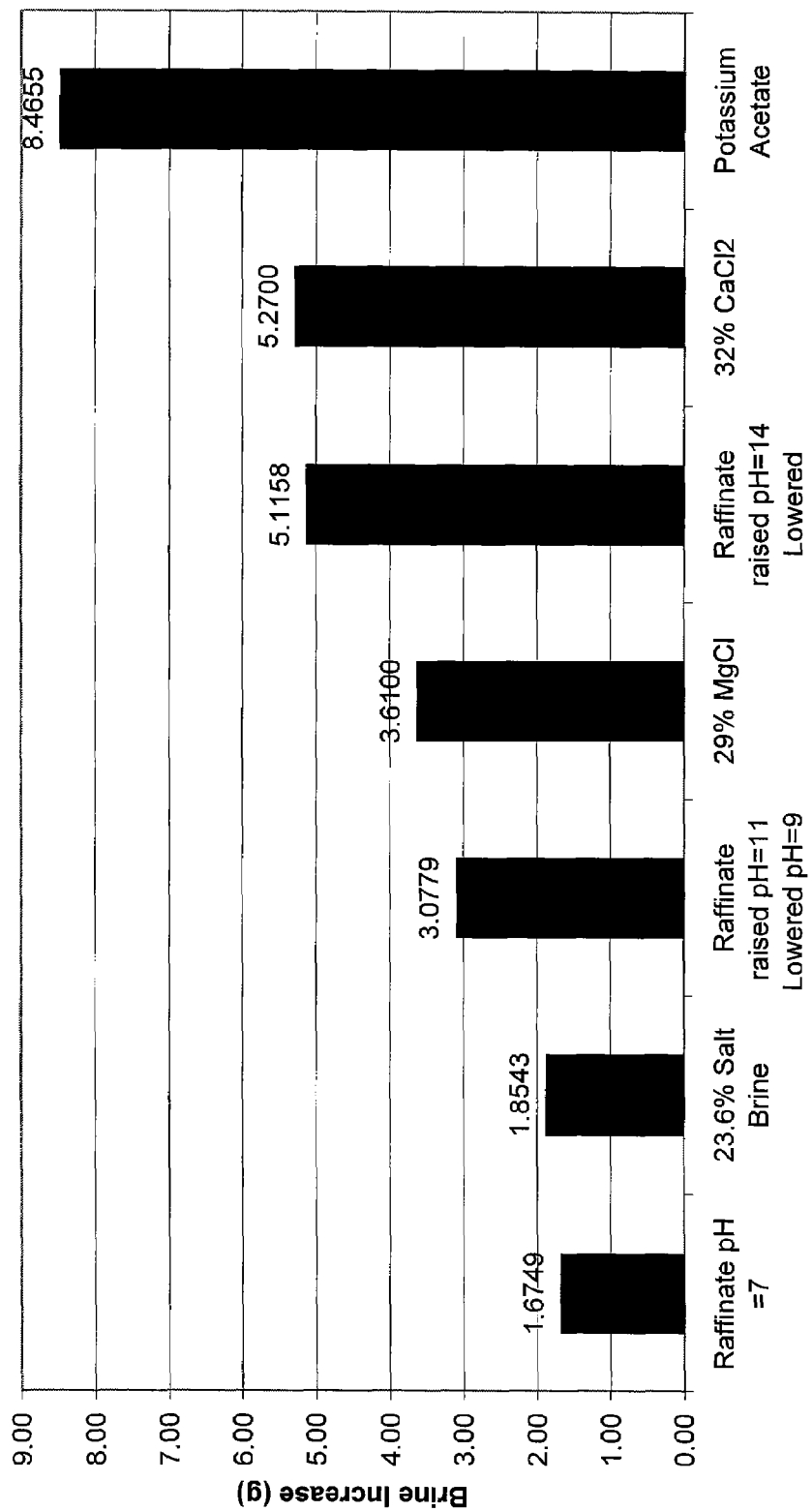
FIG. 5 demonstrates that the pretreatment of the raffinate followed by use in this invention has a positive affect on magnesium chloride by increasing both viscosity and melting performance.

In the next examples of FIG. 4 below, we start with the original raffinate, add an increased percentage of 50% liquid sodium hydroxide to reach a pH of 14. In the next step of the process, we add a higher percentage of acetic acid to lower the pH to 10. This step increases the melting value by an additional 21% with the addition of the acetic acid. If we take into account the addition of both sodium hydroxide and acetic acid we have increased melting value by a dramatic 205% over the raffinate by itself In the examples above described the addition of an acid has increased the melting value and has created a product that can be used as an enhanced ice melter with no chlorides or corrosion issues that are associated with chloride ice melters. In addition, these finished products can be added to various ice melting brines of sodium chloride, magnesium chloride, calcium chloride, potassium acetate and may include the addition of urea. In all cases, they will not only increase the viscosity of the solution of sodium chloride but will also increase its melting performance. The addition of urea is to enhance the vegetation from run off. Depending on which pH value is used, this invention can even have a positive effect on magnesium chloride by increasing both the viscosity and the melting performance. See FIG. 5.

Figure 6:
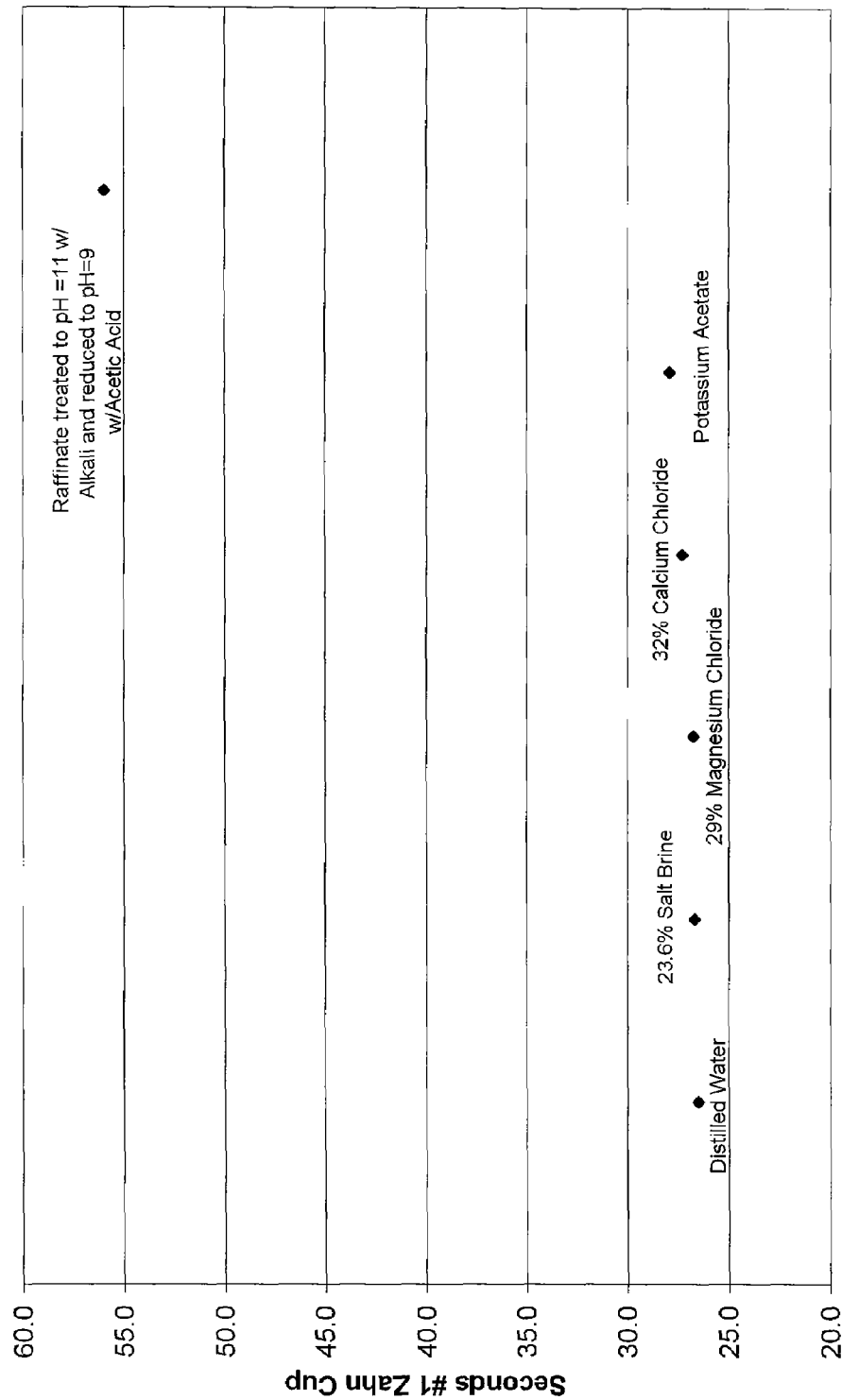
FIG. 6 indicates initial viscosity of each product compared with distilled water and the treated raffinate.
Figure 7:
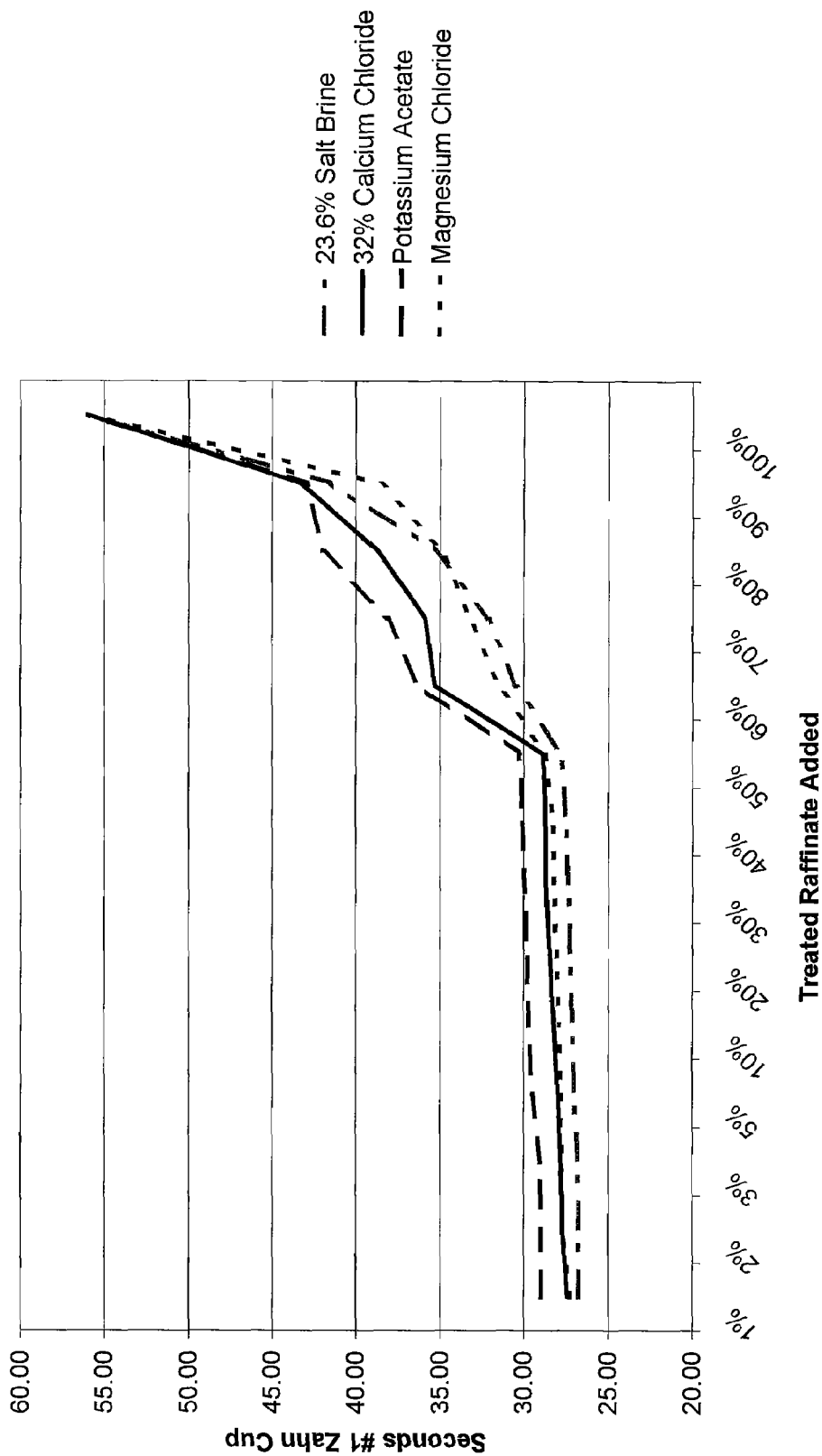
FIGS. 7-11 show the viscosity of various liquids with the addition of treated raffinate.
Figure 8:
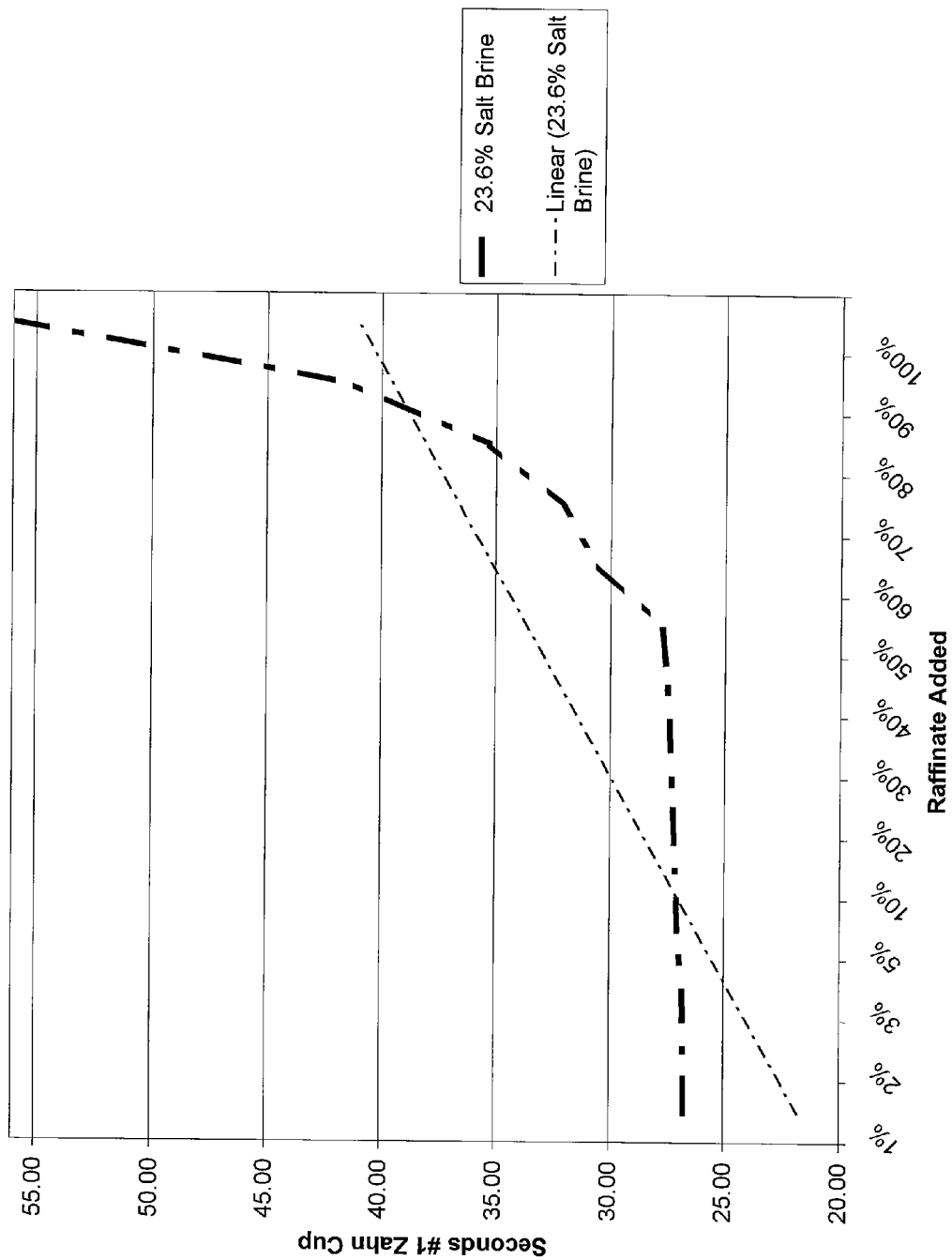
Figure 9:
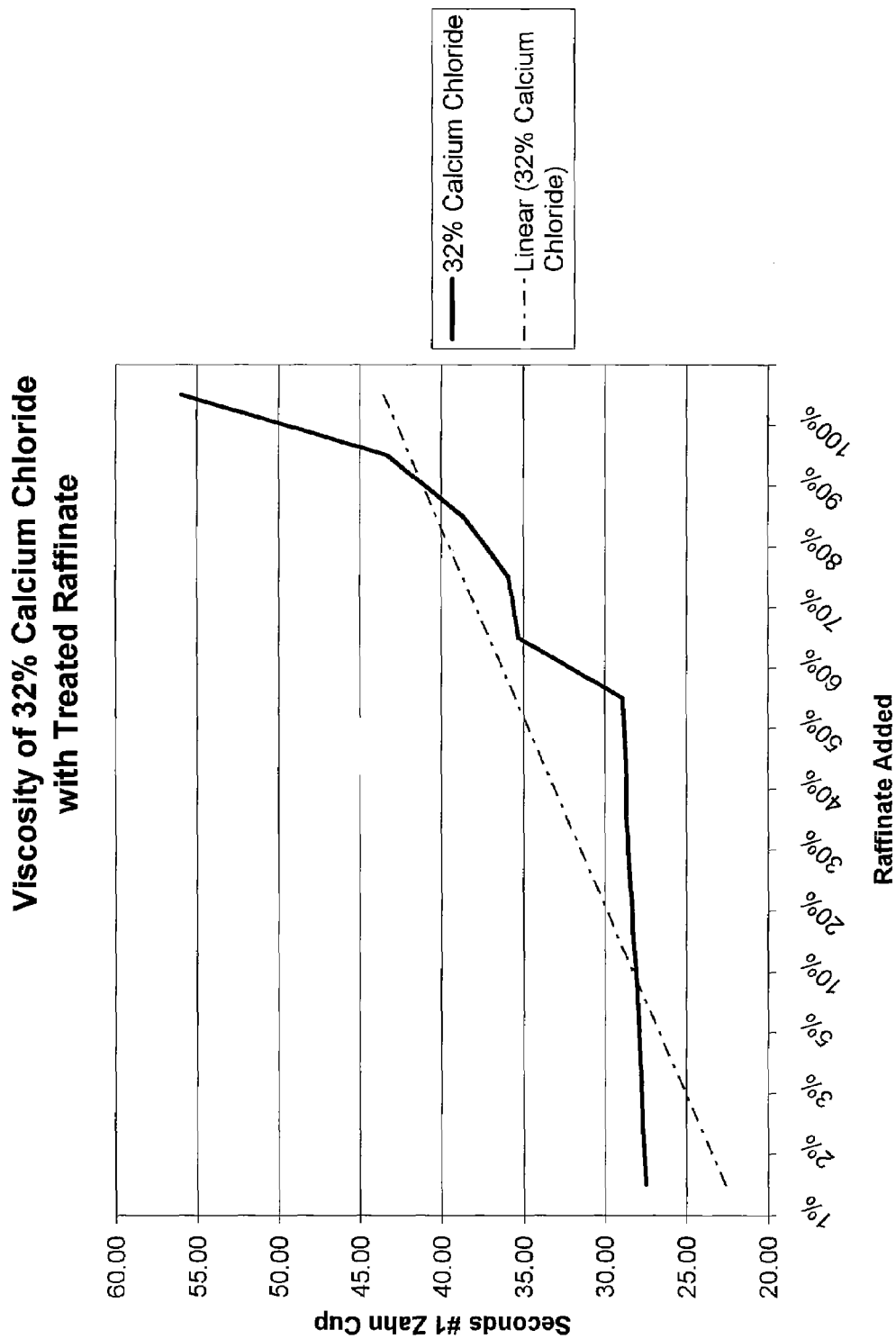
Figure 10:
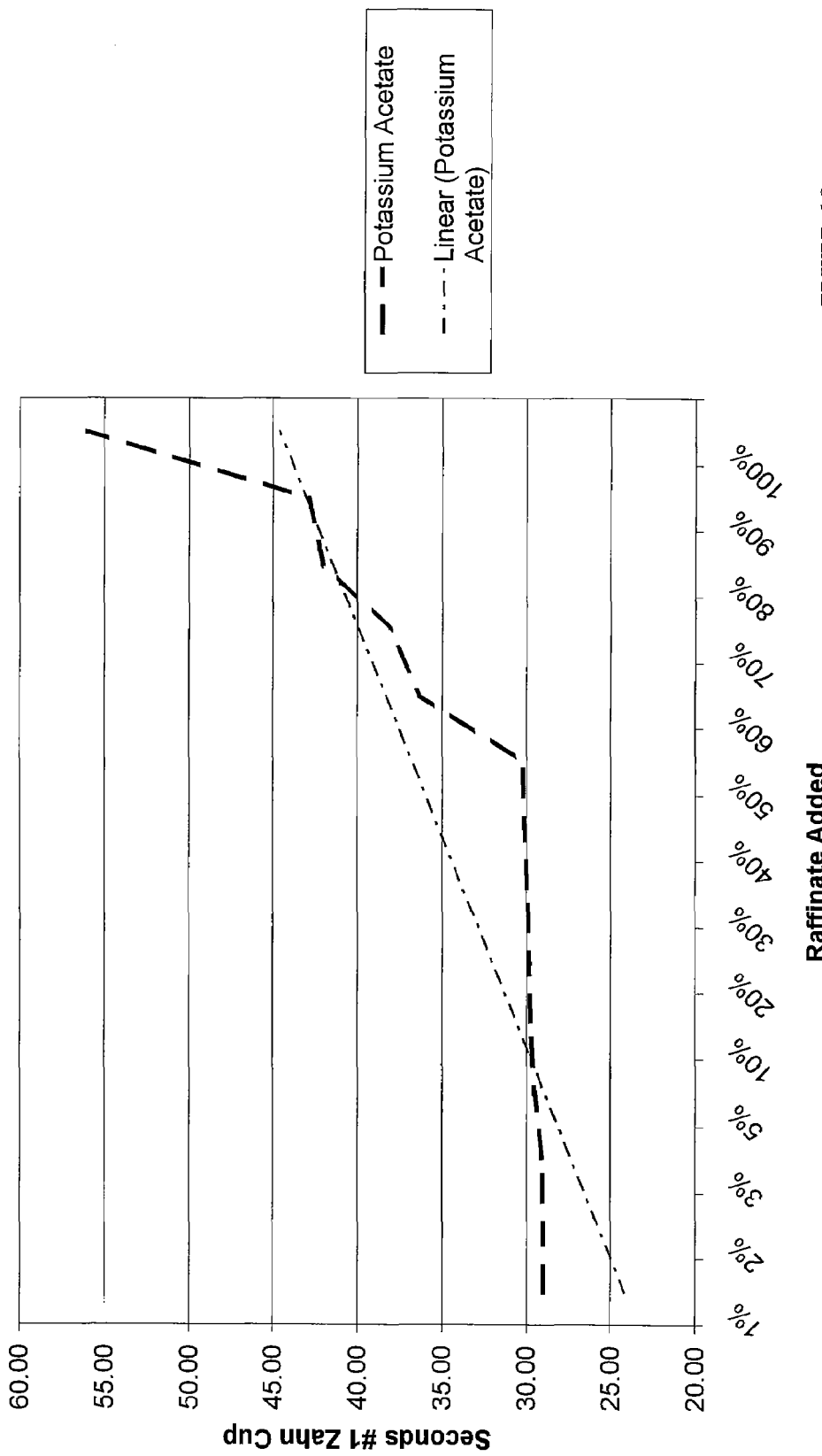
Figure 11:
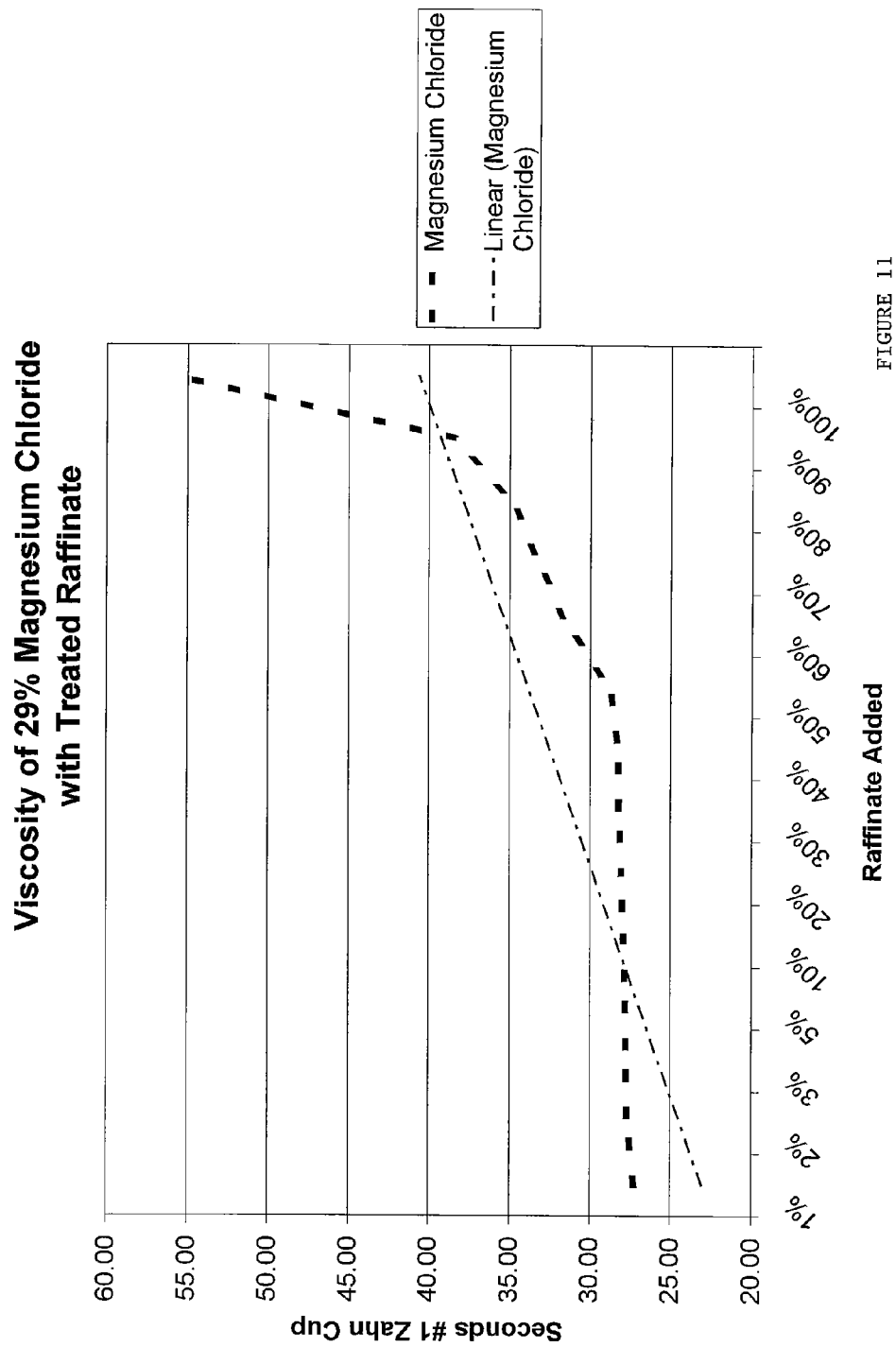

The graph of FIG. 6 indicates the initial viscosity of each product compared with distilled water and treated raffinate. Viscosity of 23.6% salt brine, 32% calcium chloride and potassium acetate can be seen blended with treated raffinate at various percentages in FIGS. 7 through 11.

As seen from the data of the examples, our invention not only provides an increase in viscosity but also enhanced melt values. This invention gives the end user more options in controlling cost, increasing melting performances, and of reducing to possibly eliminating the amount of chloride salts being used on roads, parking lots, sidewalks, etc. We next turn to processing conditions.

The typical process for making our invention composition follows. Raw material in the form of raffinate, a desugared beet molasses, is received and placed in a mixing vessel. The pH of the solution is measured and the amount of alkali to be added is determined. In our examples that follow, we have a pH of 8 for received raw material which is typical. In our illustrations below, we make two products, one with a pH of 11 and the second with a pH of 24.

First Product:
   1000 lbs of desugared beet molasses at a pH of 8
   150 lbs of 50% sodium hydroxide is added
   The tank is agitated during the addition of the sodium hydroxide and some heat is generated. After the material is allowed to cool the pH is taken to confirm the target pH of 11 has been achieved.
   35 lbs of acetic acid is then added.
   The tank is agitated during the addition of the acetic acid and some heat will be generated. After the material is allowed to cool, the pH is taken to confirm the target pH of 9 has been achieved.

Second Product:
   1000 lbs of desugared beet molasses at a pH of 8
   300 lbs of 50% sodium hydroxide is added.
   The tank is agitated during the addition of the sodium hydroxide and some heat will be generated. After the material is allowed to cool, the pH is taken to confirm the target pH of 13.8.
   The tank is agitated during the addition of the acetic acid and some heat will be generated. After the material is allowed to cool, the pH is taken to confirm that the target pH of 10 has been achieved.

As seen from the preparation of the first and second products above, the process is workable, easy to follow and economical. The time period for the sufficient degradation to occur when the pH is initially raised in the process of making the treated raffinate will vary from 12 hours to 36 hours but generally 24 hours is a satisfactory period.

From the above examples, our invention confirms the additions of sodium hydroxide can considerably increase the melting value to desugared beet molasses. The addition of acetic acid to bring the pH of the solution down to a useable level has also shown an increase in melting value. Our invention brings to the market place a significant improvement over various other agriculture based products that far exceeds their melting values and allows us to increase the viscosity of the solution at the same time.

From the above, it can be seen that the invention accomplishes its primary objective as well as others. Provided is a versatile treated raffinate composition that can be used alone or blended with other ice melters to achieve a variety of useful compositions.

What is claimed is:

1. A composition for both de-icing and inhibiting formation of ice and snow, comprising:
   desugared sugar beet molasses which has been initially treated with alkali to increase its pH to at least 11, followed by holding for a time sufficient to degrade the sugar beet molasses and then its followed by acid addition to reduce the pH to 10 or less.

2. The composition of 1 which is blended with additional ice melter components.

3. The composition of 2 which includes additional ice melters and minors selected from the group consisting of abrasives, surfactants, stabilizers, corrosion inhibitors, vegetation friendly ice melter additives, liquid sodium chloride, liquid calcium chloride, liquid magnesium chloride, and liquid potassium acetate.

4. The composition of 2 which is at least 3% by weight of the desugared, sugar beet molasses.

5. The composition of 2 which includes from about 10% by weight to about 50% of desugared sugar beet molasses.

6. The composition of 1 whose pH is initially raised with alkali to within the range of about 11 to about 14.

7. The composition of 6 whose pH after holding is lowered by acid addition to 9 or less.

8. A method of preparing a de-icing and ice formation inhibiting composition which comprises:
   treating desugared beet molasses with alkali to increase its pH to at least 11;
   holding said increased pH desugared beet molasses for a time sufficient to allow its carbohydrates to degrade;
   lowering the pH with an acid addition to 10 or less; and
   using the above treated desugared, sugar beet molasses as an additive to de-icing compositions to increase melt value of said de-icing compositions.

9. The process of 7 wherein the pH is initially increased to within the range of from about 11 to about 14.

10. The process of 8 wherein the pH is lowered to 9 or less by said acid addition.

11. The process of 8 wherein the treated desugared beet molasses is used in a de-icer composition at a weight range of from at least 3% of said composition.

12. The method of 8 wherein the alkali used to raise the pH is selected from the group consisting of sodium hydroxide and calcium hydroxide.

13. The method of 12 wherein the alkali is sodium hydroxide.

14. The method of 8 wherein the pH is lowered by addition of an acid selected from the group consisting of inorganic acids and acetic acid.

15. The method of 12 wherein the acid is acetic acid.

16. A method of deicing, comprising: applying treated raffinate to a surface that is to be deiced.

17. The method of 16 wherein the treated raffinate is applied by blending with other deicers.

18. The method of 17 wherein the treated raffinate is at least 3% of the deicer blend.

* * * * *